United States Patent
Takimoto et al.

(10) Patent No.: US 12,198,402 B2
(45) Date of Patent: Jan. 14, 2025

(54) EVENT OCCURRENCE TIME LEARNING DEVICE, EVENT OCCURRENCE TIME ESTIMATION DEVICE, EVENT OCCURRENCE TIME LEARNING METHOD, EVENT OCCURRENCE TIME ESTIMATION METHOD, EVENT OCCURRENCE TIME LEARNING PROGRAM, AND EVENT OCCURRENCE TIME ESTIMATION PROGRAM

(71) Applicant: NIPPON TELEGRAPH AND TELEPHONE CORPORATION, Tokyo (JP)

(72) Inventors: Yoshiaki Takimoto, Tokyo (JP); Yusuke Tanaka, Tokyo (JP); Takeshi Kurashima, Tokyo (JP); Shuhei Yamamoto, Tokyo (JP); Maya Okawa, Tokyo (JP); Hiroyuki Toda, Tokyo (JP)

(73) Assignee: NIPPON TELEGRAPH AND TELEPHONE CORPORATION, Tokyo (JP)

(*) Notice: Subject to any disclaimer, the term of this patent is extended or adjusted under 35 U.S.C. 154(b) by 479 days.

(21) Appl. No.: 17/613,062

(22) PCT Filed: May 22, 2019

(86) PCT No.: PCT/JP2019/020346
§ 371 (c)(1),
(2) Date: Nov. 20, 2021

(87) PCT Pub. No.: WO2020/235066
PCT Pub. Date: Nov. 26, 2020

(65) Prior Publication Data
US 2022/0222915 A1 Jul. 14, 2022

(51) Int. Cl.
*G06T 7/00* (2017.01)
*G06T 7/73* (2017.01)
(Continued)

(52) U.S. Cl.
CPC ............... *G06V 10/62* (2022.01); *G06T 7/73* (2017.01); *G06V 10/82* (2022.01); *G06V 20/44* (2022.01);
(Continued)

(58) Field of Classification Search
CPC ........ G06V 10/62; G06V 10/82; G06V 20/44; G06V 20/35; G06T 7/73;
(Continued)

(56) References Cited

U.S. PATENT DOCUMENTS

2012/0271587 A1* 10/2012 Shibuya ............ G05B 23/0229
702/127
2017/0181711 A1* 6/2017 Cheng .................. A61B 5/0022
2018/0170372 A1* 6/2018 Takamatsu ....... G08G 1/096725

FOREIGN PATENT DOCUMENTS

JP 201181697 A 4/2011
WO 2017038166 A1 3/2017

OTHER PUBLICATIONS

Takimoto et al. (2019) "Hearing hat occurrence prediction based on drive recorder data" DEIM Forum, Mar. 4, 2019 [online] website: http://db-event.jpn.org/deim2019/post/papers/388.pdf.
(Continued)

*Primary Examiner* — Ping Y Hsieh

(57) ABSTRACT

A hazard estimation unit 21 estimates a likelihood of an occurrence of an event according to a hazard function, with respect to each of a plurality of pieces of time-series data that are a series of multiple pieces of data to which an event occurrence time relevant to the data is given in advance and that include time-series data in which the event did not occur
(Continued)

and time-series data in which the event occurred. A parameter estimation unit 22 estimates a parameter of the hazard function so as to optimize a likelihood function expressed by including the event occurrence time given with respect to each of the plurality of pieces of time-series data and the likelihood of the occurrence of the event estimated with respect to each of the plurality of pieces of time-series data.

5 Claims, 6 Drawing Sheets

(51) Int. Cl.
  *G06V 10/62* (2022.01)
  *G06V 10/82* (2022.01)
  *G06V 20/40* (2022.01)
(52) U.S. Cl.
  CPC ............... *G06T 2207/20081* (2013.01); *G06T 2207/20084* (2013.01)

(58) Field of Classification Search
  CPC ........... G06T 2207/20081; G06T 2207/20084; G06T 2207/10016; G06T 2207/20076; G06T 2207/30196; G06T 7/00; G06N 3/04; G06N 20/00
  See application file for complete search history.

(56) References Cited

OTHER PUBLICATIONS

Ren et al. (2018) "Deep Recurrent Survival Analysis".
Yamamoto et al. 2018) "Traffic Near-miss Target Classification on Event Recorder Data" IPSJ Symposium Series: Multimedia, Distributed, Cooperative and Mobile Symposium (DICOMO2018) vol. 2018, No. 1, pp. 542-553.

* cited by examiner

EVENT OCCURRENCE TIME LEARNING DEVICE, EVENT OCCURRENCE TIME ESTIMATION DEVICE, EVENT OCCURRENCE TIME LEARNING METHOD, EVENT OCCURRENCE TIME ESTIMATION METHOD, EVENT OCCURRENCE TIME LEARNING PROGRAM, AND EVENT OCCURRENCE TIME ESTIMATION PROGRAM

CROSS-REFERENCE TO RELATED APPLICATIONS

This application is a U.S. National Stage Application filed under 35 U.S.C. § 371 claiming priority to International Patent Application No. PCT/JP2019/020346, filed on 22 May 2019, the disclosure of which is hereby incorporated herein by reference in its entirety.

TECHNICAL FIELD

The present disclosure relates to an event occurrence time learning device, an event occurrence time estimation device, an event occurrence time learning method, an event occurrence time estimation method, an event occurrence time learning program, and an event occurrence time estimation program.

BACKGROUND ART

A technique has conventionally been known by which a time period until an event occurs is estimated by using a series of multiple pieces of data obtained in a time series. For example, in Non-Patent Literature 1, using a survival analysis and a deep learning technique (in particular, a Recurrent Neural Network [RNN]) makes it possible to estimate a time period until the occurrence of an event (e.g., the occurrence of a near miss incident) on the basis of a series of multiple images from a drive recorder, by constructing a model of a non-linear relationship between characteristics of the positions or the like of pedestrians and vehicles in the surroundings and time periods until the occurrence of near miss incidents.

Further, a technique is known by which, as described in Non-Patent Literature 2, a time period until the occurrence of an event is estimated on the basis of information (e.g., diagnosis/treatment data) available at a point in time of estimation, without pre-assuming any event occurrence distribution. More specifically, using a survival analysis and a deep learning technique (in particular, an RNN) makes it possible to estimate the time period until the occurrence of the event, by constructing a model of a non-linear relationship between the diagnosis/treatment data and a likelihood of the occurrence of an event during each time section (e.g., during the day of the diagnosis/treatment or on the following day), (for example, a relationship between numerical values such as blood pressure values and blood cholesterol levels in the diagnosis/treatment data and disease incidence rates).

CITATION LIST

Non-Patent Literature

Non-Patent Literature 1: Takimoto, et al., "Drive Recorder Data ni Motozuku Hiyari Hatto Hassei Suitei (Estimation of Occurrence of Near Miss Incidents Based On Drive Recorder Data—in Japanese)", DEIM 2019; retrieved from the Internet: <URL: http://db-event.jpn.org/deim2019/post/papers/388.pdf>

Non-Patent Literature 2: Kan Ren, et al., "Deep Recurrent Survival Analysis", In: arXiv preprint arXiv: 1809.02403 (2018).

SUMMARY OF THE INVENTION

Technical Problem

The above conventional techniques, however, have some problems yet to be solved.

According to the technique described in Non-Patent Literature 1, it is necessary to determine, in advance, a relationship between elapsed time periods since the point in time of estimation and a distribution of likelihoods of the occurrence of the event as shown in FIG. 8. Accordingly, when complicated temporal changes are involved or when the relationship cannot be grasped in advance, it is impossible to properly understand the time period until the occurrence of the event. For example, let us discuss a situation in which pictures taken by a drive recorder are used as inputs, while a traffic accident serves as the event. It is considered that the likelihood of the occurrence of a traffic accident changes depending on the positions and relative speeds of the objects in the surroundings, or the like. However, the manner in which impacts are imposed (the degree of risk and the duration of the impacts) can be extremely complicated. For example, the probability of a collision with a vehicle travelling side-by-side does not change over time. In contrast, although a pedestrian seen ahead has a probability of having a collision in the time period from one second later to three seconds later, the pedestrian has no probability of having a collision at other times. In addition, it is considered that even the same pedestrian may be more likely to have a collision only a moment later, depending on the speed of the vehicle in question. It is therefore difficult to imagine various situations such as these and to preliminarily understand the form of the distribution in advance. The precision level of the estimation is thus limited.

The technique described in Non-Patent Literature 2 has a problem where it is impossible to properly understand the temporal changes in the inputs, because it is impossible to handle time-series data as the inputs. For example, let us discuss a situation in which, similarly to the above, pictures taken by a drive recorder are used as the inputs, while a traffic accident serves as the event. To estimate the timing with which a traffic accident may occur, it is necessary to consider movements of objects and to take into account whether the pedestrians in the surroundings are moving closer or moving away as well as the speeds of the pedestrians. The technique described in Non-Patent Literature 2, however, is unable to obtain these pieces of information.

In view of the circumstances described above, it is an object of the techniques of the present disclosure to provide an event occurrence time learning device, an event occurrence time learning method, and an event occurrence time learning program capable of learning a hazard mathematical function (hereinafter, "hazard function") used for estimating, with an excellent level of precision, a time at which an event may occur, on the basis of time-series data.

In addition, another object is to provide an event occurrence time estimation device, an event occurrence time estimation method, and an event occurrence time estimation program capable of estimating, with an excellent level of precision, a time at which an event may occur, on the basis of time-series data.

Means for Solving the Problem

A first mode of the present disclosure provides an event occurrence time learning device including: a hazard estimation unit that estimates a likelihood of an occurrence of an event according to a hazard function, with respect to each of a plurality of pieces of time-series data that are a series of multiple pieces of data to which an event occurrence time relevant to the data is given in advance and that include time-series data in which the event did not occur and time-series data in which the event occurred; and a parameter estimation unit that estimates a parameter of the hazard function so as to optimize a likelihood function expressed by including the event occurrence time given with respect to each of the plurality of pieces of time-series data and the likelihood of the occurrence of the event estimated with respect to each of the plurality of pieces of time-series data. The hazard function estimates the likelihood of the occurrence of the event at an estimation target time, on a basis of a feature value of each of two or more pieces of data included in the time-series data and a feature value of the estimation target time regarding the likelihood of the occurrence of the event.

A second mode of the present disclosure provides an event occurrence time estimation device including: an input unit that receives an input of target time-series data including a series of multiple pieces of data; a hazard estimation unit that estimates, with respect to the target time-series data, a likelihood of an occurrence of an event relevant to the data, according to a hazard function using an already-learned parameter; and an event occurrence time estimation unit that estimates a time at which the event may occur next, on a basis of the estimated likelihood of the occurrence of the event. The hazard function estimates the likelihood of the occurrence of the event at an estimation target time, on a basis of a feature value of each of two or more pieces of data included in the target time-series data and a feature value of the estimation target time regarding the likelihood of the occurrence of the event.

A third mode of the present disclosure provides an event occurrence time learning method including: estimating, by a hazard estimation unit, a likelihood of an occurrence of an event according to a hazard function, with respect to each of a plurality of pieces of time-series data that are a series of multiple pieces of data to which an event occurrence time relevant to the data is given in advance and that include time-series data in which the event did not occur and time-series data in which the event occurred; and estimating, by a parameter estimation unit, a parameter of the hazard function so as to optimize a likelihood function expressed by including the event occurrence time given with respect to each of the plurality of pieces of time-series data and the likelihood of the occurrence of the event estimated with respect to each of the plurality of pieces of time-series data. The hazard function estimates the likelihood of the occurrence of the event at an estimation target time, on a basis of a feature value of each of two or more pieces of data included in the time-series data and a feature value of the estimation target time regarding the likelihood of the occurrence of the event.

A fourth mode of the present disclosure provides an event occurrence time estimation method including: receiving, by an input unit, an input of target time-series data including a series of multiple pieces of data; estimating, by a hazard estimation unit, with respect to the target time-series data, a likelihood of an occurrence of an event relevant to the data, according to a hazard function using an already-learned parameter; and estimating, by an event occurrence time estimation unit, a time at which the event may occur next, on a basis of the estimated likelihood of the occurrence of the event. The hazard function estimates the likelihood of the occurrence of the event at an estimation target time, on a basis of a feature value of each of two or more pieces of data included in the target time-series data and a feature value of the estimation target time regarding the likelihood of the occurrence of the event.

A fifth mode of the present disclosure provides an event occurrence time learning program that causes a computer to execute: estimating a likelihood of an occurrence of an event according to a hazard function, with respect to each of a plurality of pieces of time-series data that are a series of multiple pieces of data to which an event occurrence time relevant to the data is given in advance and that include time-series data in which the event did not occur and time-series data in which the event occurred; and estimating a parameter of the hazard function so as to optimize a likelihood function expressed by including the event occurrence time given with respect to each of the plurality of pieces of time-series data and the likelihood of the occurrence of the event estimated with respect to each of the plurality of pieces of time-series data. The hazard function estimates the likelihood of the occurrence of the event at the estimation target time, on a basis of a feature value of each of two or more pieces of data included in the time-series data and a feature value of the estimation target time regarding the likelihood of the occurrence of the event.

A sixth mode of the present disclosure provides an event occurrence time estimation program that causes a computer to execute: receiving an input of target time-series data including a series of multiple pieces of data; estimating, with respect to the target time-series data, a likelihood of an occurrence of an event relevant to the data, according to a hazard function using an already-learned parameter; and estimating a time at which the event may occur next, on a basis of the estimated likelihood of the occurrence of the event. The hazard function estimates the likelihood of the occurrence of the event at an estimation target time, on a basis of a feature value of each of two or more pieces of data included in the target time-series data and a feature value of the estimation target time regarding the likelihood of the occurrence of the event.

Effects of the Invention

One of the techniques of the present disclosure makes it possible to learn the hazard function used for estimating, with an excellent level of precision, the time at which the event may occur on the basis of the time-series data.

Another one of the techniques of the present disclosure makes it possible to estimate, with an excellent level of precision, the time at which the event may occur on the basis of the time-series data.

DESCRIPTION OF EMBODIMENTS

Figure 1:
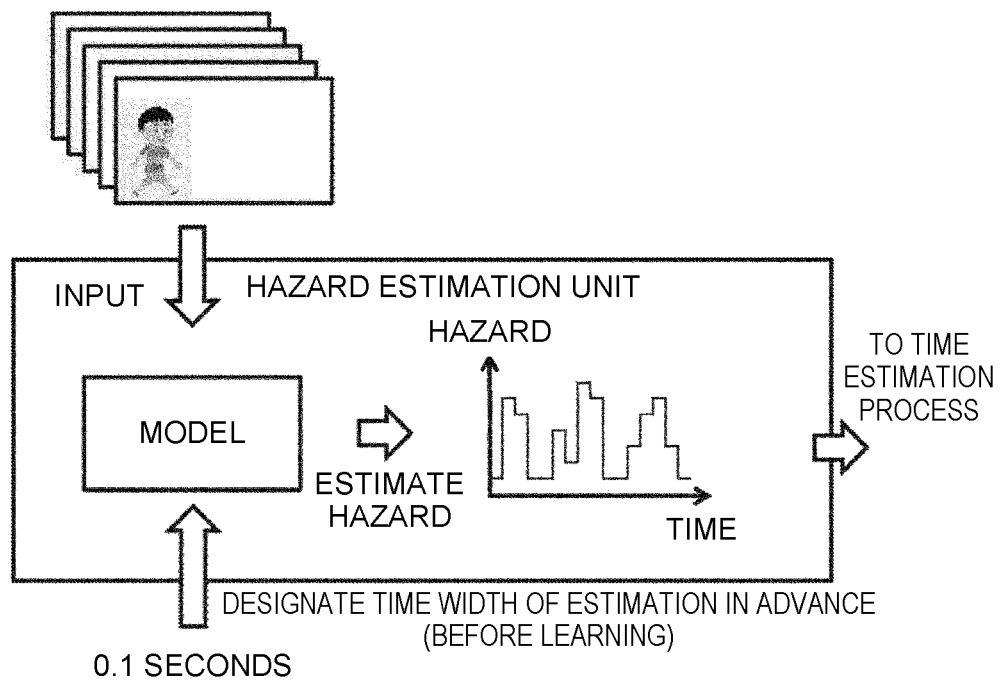
FIG. 1 is a drawing for explaining a method for estimating a hazard according to the present embodiment.

The following will describe some examples of embodiments of the techniques of the present disclosure with reference to the drawings. In the drawings, some of the constituent elements and parts that are the same as or equivalent to one another will be referred to by using the same reference characters. Further, the proportions of dimensions in the drawings are exaggerated for the sake of convenience in the explanation and may be different from the proportions in actuality.

An Outline of the Present Embodiment

In the present embodiment, the technique described in Non-Patent Literature 2 will be expanded so as to be able to handle time-series data, and a model will be constructed, as shown in FIG. 1, of a non-linear relationship between the time-series data and a likelihood of the occurrence of an event in each of the time sections, without pre-assuming any particular distribution. As a result, it is possible to make the estimation with an excellent level of precision even in the situations described above, by simply determining, in advance, the granularity of the times of estimation, while taking into account the calculation amount and the granularity of the time necessary at the time of output. Let us discuss a situation in which, similarly to the above, pictures taken by a drive recorder are used as inputs, while a traffic accident serves as the event. No particular distribution will be pre-assumed, although the times of estimation will be discretized. It is therefore possible to flexibly grasp complicated impacts imposed on the likelihood of the occurrence of a traffic accident dependent on the positions of objects in the surroundings, a speed relative to the objects in the surroundings, the types of the objects in the surroundings, and the like and is thus possible to understand a likelihood of an event hazard under any distribution having an arbitrary shape. Accordingly, it is possible to understand the likelihood of the occurrence of the event with a higher level of precision than that of the technique described in Non-Patent Literature 1.

Further, in the present embodiment, the technique described in Non-Patent Literature 2 is expanded so as to be able to handle time-series, so that temporal changes in the inputs are grasped by using a Recurrent Neural Network (RNN). With this arrangement, when estimating the timing of the occurrence of a traffic accident, it is possible to consider movements of objects and to take into account whether the pedestrians in the surroundings are moving closer or moving away as well as the speeds of the pedestrians in the surroundings. It is therefore possible to estimate the timing of the occurrence of a traffic accident.

<A Configuration of an Event Occurrence Time Estimation Device According to the Present Embodiment>

The following will describe in detail an embodiment of the present disclosure with reference to the drawings.

In the present embodiment, an example will be explained in which an event occurrence time learning device and an event occurrence time estimation device are provided in a single device. In the following sections, an example will be explained in which the event occurrence time learning device and the event occurrence time estimation device are combined together to structure an event occurrence time estimation device.

Figure 2:
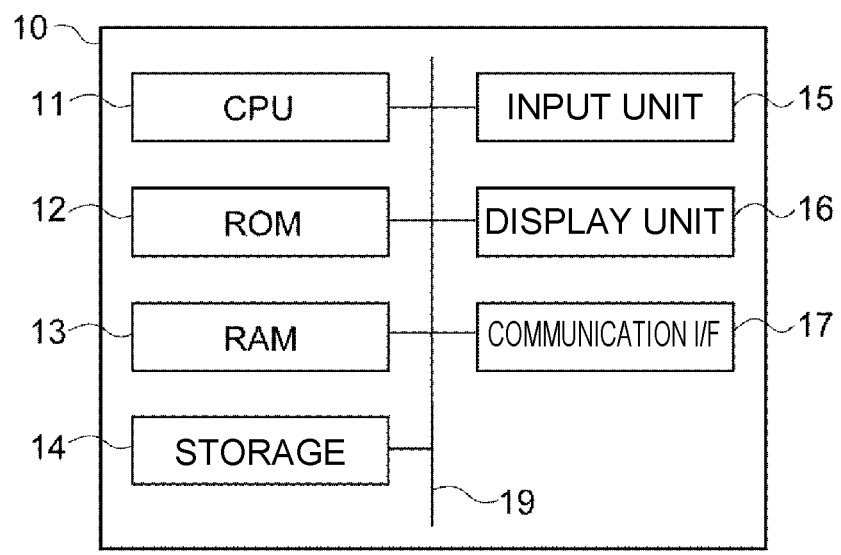
FIG. 2 is a schematic bock diagram of an example of a computer that functions as an event occurrence time estimation device according to the present embodiment.

FIG. 2 is a block diagram showing a hardware configuration of an event occurrence time estimation device 10 according to the present embodiment.

As shown in FIG. 2, the event occurrence time estimation device 10 includes a Central Processing Unit (CPU) 11, a Read-Only Memory (ROM) 12, a Random Access memory (RAM) 13, a storage 14, an input unit 15, a display unit 16, and a communication interface (I/F) 17. These constituent elements are communicably connected to one another via a bus 19.

The CPU 11 is a central processing unit and executes various types of programs and controls functional units. In other words, the CPU 11 reads any of the programs either from the ROM 12 or the storage 14 and executes the programs by using the RAM 13 as a working area. The CPU 11 controls the abovementioned constituent elements and performs various types of computation processes according to the programs each stored in either the ROM 12 or the storage 14. In the present embodiment, either the ROM 12 or the storage 14 stores therein an event occurrence time learning program to learn a hazard function used for estimating an event occurrence time and an event occurrence time estimation program for estimating an event occurrence time. The event occurrence time learning program and the event occurrence time estimation program may each be one program or may each be a group of programs formed by a plurality of programs or modules.

The ROM 12 stores therein various types of programs and various types of data. Serving as a working area, the RAM 13 temporarily stores therein a program or data. The storage 14 is configured by using a Hard Disk Drive (HDD) or a Solid State Drive (SDD) and stores therein various types of programs including an operating system, as well as various types of data.

The input unit 15 includes a pointing device (e.g., a mouse) and a keyboard and is used for performing various types of input operations.

The display unit 16 may be, for example, a liquid crystal display device and displays various types of information. The display unit 16 may use a touch panel scheme so as to function as the input unit 15.

The communication interface 17 is an interface used for communicating with other devices. For example, a standard such as an Ethernet (registered trademark), FDDI, or Wi-Fi (registered trademark) may be applied thereto.

Figure 3:
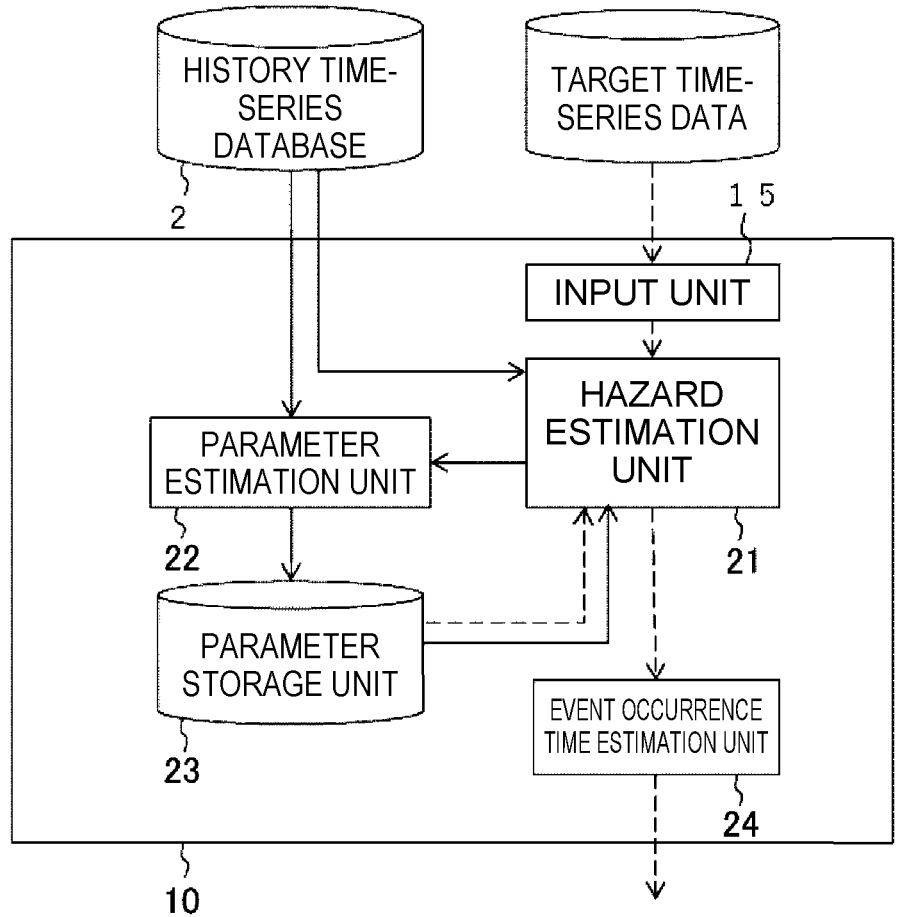
FIG. 3 is a block diagram showing a configuration of the event occurrence time estimation device according to the present embodiment.

Next, a functional configuration of the event occurrence time estimation device 10 will be explained. FIG. 3 is a block diagram showing the functional configuration of the event occurrence time estimation device 10.

As shown in FIG. 3, the event occurrence time estimation device 10 includes, as functional configurations thereof, a hazard estimation unit 21, a parameter estimation unit 22, a parameter storage unit 23, an event occurrence time estimation unit 24, and the input unit 15. The functional configurations are realized as a result of the CPU 11 reading the event occurrence time learning program and the event occurrence time estimation program stored either in the ROM 12 or the storage 14 and further loading the programs into the RAM 13 and executing the programs.

In the drawing, the solid-line arrows indicate data communication and the direction of the communication at the time of functioning as the event occurrence time learning device. The broken-line arrows indicate data communication and the direction of the communication at the time of functioning as the event occurrence time estimation device.

Further, the event occurrence time estimation device 10 is connected to a history time-series database 2 via communication means, so that communication is performed therebetween. As the communication means, it is possible to use arbitrary publicly-known communication means. For example, the event occurrence time estimation device 10 may be connected to the history time-series database 2 via communication means that communicate according to Transmission Control Protocol/Internet Protocol (TCP/IP) such as the Internet. Alternatively, the communication means may be communication means according to any other protocol.

Further, the history time-series database 2 is configured by using a computer or a server computer including well-known hardware such as a computation processing unit, a main storage device, an auxiliary storage device, a data bus, an input/output interface, and a communication interface. In the present embodiment, an example will be explained in which the history time-series database 2 is provided on the outside of the event occurrence time estimation device 10. However, the history time-series database 2 may be provided inside the event occurrence time estimation device 10.

The history time-series database 2 stores therein K sets each made up of the following three: time-series data (see the expression below) prepared in advance for the learning purpose and obtained at predetermined constant time intervals; an event occurrence or discontinuation time $e^k$ relevant to the data; and an indicator variable $\delta^k$ that is equal to 1 when an event has occurred and is equal to 0 when discontinuation has occurred.

$$X^k = \left\{ x_0^k, \ldots, x_{|X^k|}^k \right\}$$

The discontinuation time denotes a time at which the observation of the data is terminated. An identifier of the time-series data is expressed as shown in below.

$$k (\in \mathbb{N})$$

The vector $x_i^k$ is a vector expressing i-th data included in time-series data $X^k$, whereas $|X^k|$ expresses the length of the time-series data $X^k$. The data $x_i^k$ is data obtained at a time $t_i^k$. When $t_0^k$ denotes an observation start time, the relationship shown below is true:

$$t_{|X^k|}^k \leq e^k < t_{|X^k|+1}^k$$

With respect to an arbitrary combination expressed as $$(i, i', k, k') \in \mathbb{N}^4$$

the relationship shown below is satisfied:

$$t_{i+1}^k - t_i^k = t_{i'+1}^{k'} - t_{i'}^{k'}$$

The time-series data is, for example, a group of time-series images formed by a series of multiple images to which an event occurrence time is given in advance. The group of time-series images is formed by the series of multiple images taken at prescribed time intervals. The series of multiple images may be a video picture, for example. Examples of the event include an event relevant to one of the person taking the images, an imaged person, and an imaged object. Further, the event may be an event appearing in the picture such as an event in which a change occurs to the imaged person or the imaged object or may be an event not appearing in the picture such as an event related to the person taking the images.

In this situation, the time-series images do not necessarily have to be images recorded by taking a moving picture while using a video camera or the like and may be images taken by a digital still camera at prescribed time intervals such as time lapse images, for example.

Further, the person taking the images may be a human being or an animal that takes the images by using a device such as a video camera or a digital still camera that takes and records the time-series images or may be a robot or a vehicle such as an automobile provided with the device that takes and records the images.

The input unit 15 receives target time-series data. The target time-series data is time-series data X from a certain point in time in the past to the present time and may be expressed by using an identifier c as shown below, similarly to the time-series data in the history time-series database 2.

$$X^c = \left\{ x_0^c, \ldots, x_{|X^c|}^c \right\}$$

In this situation, an event may or may not occur during $X^c$.

According to the hazard function, the hazard estimation unit 21 estimates a likelihood of the occurrence of the event, with respect to each of the plurality of pieces of time-series data $X^k$ including time-series data $X^k$ in which the event did not occur and time-series data $X^k$ in which the event occurred. More specifically, according to the hazard function using a neural network, the hazard estimation unit 21 extracts a feature value of each of the plurality of pieces of data included in the time-series data and a feature value of an elapsed time period from the time corresponding to the last piece of data in the time-series data to an estimation target time, and further estimates the likelihood of the occurrence of the event on the basis of the extracted feature values.

For example, at first, the hazard estimation unit 21 receives the time-series data X from either the history time-series database 2 or the target time-series data, receives a model parameter θ from the parameter storage unit 23 (explained later), and further outputs hazard functions $h_{i,0}, \ldots,$ and $h_{i,j}$ each representing a conditional probability expressing the likelihood of the occurrence of the event, by utilizing a deep learning technique or the like. In this situation, the symbol $h_{ij}$ expresses the likelihood of the occurrence of the event in the duration from $\Delta t_{j-1}$ later to $\Delta t_j$ later, when the estimation is made at the time $t_i$. A definition expression is presented below.

$$h_{ij} = Pr(\Delta t_{j-1} < \Delta t_e \le \Delta t_j \mid \Delta t_{j-1} < \Delta t_e, x_0, x_1, \ldots, x_i) \quad \text{[Math. 1]}$$

In the above expression, the symbol $\Delta t_1$ denotes an elapsed time period (hereinafter, "estimation target time") since the point in time of estimation. Both of the equations $\Delta t_0 = 0$ and $\Delta t_j - \Delta t_{j-1} = \Delta t_{j'} - \Delta t_{j'-1}$ are true. However, generally speaking, $\Delta t_j - \Delta t_{j-1} \ne t^k_{i+1} - t^k_i$ is true, although $\Delta t_j - \Delta t_{j-1} = t^k_{i+1} - t^k_i$ can be true. Further, the symbol $\Delta t_e$ denotes the time period it takes for the event to occur since the point in time of estimation. The symbol $\Delta t_J$ denotes the longest time period taken into consideration at the time of the estimation.

As for a specific method for calculating $h_{ij}$, it is possible to use an expression such as the one presented below:

[Math. 2]

$$h_{ij} = f(x_i, \Delta t_j \mid r_{i-1,j}; \theta) \quad (1)$$

The above expression is a function f expressed by a neural network including a network structure capable of handling sequences, such as an RNN. In the above expression, $r_{i,j}$ denotes a hidden layer of the RNN or the like.

Figure 4:
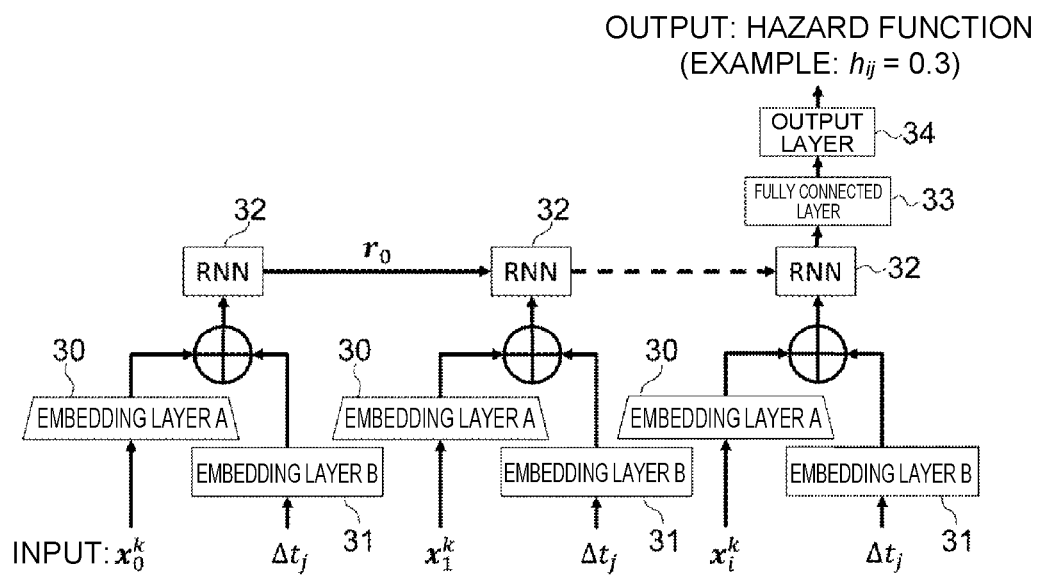
FIG. 4 is a block diagram showing a structure of a neural network according to the present embodiment.

A specific example of the network structure is shown in FIG. 4. The network is configured so as to include embedding layer A 30, embedding layer B 31, an RNN layer 32, a fully connected layer 33, and an output layer 34.

Embedding layer A 30 is a layer that extracts a feature value from each of the pieces of data in the time-series data and embeds the feature values in a feature space. In the present example, by using the fully connected layer, a convolution layer, and a combination of the fully connected layer and the convolution layer, the feature value of each of the pieces of data is extracted and vectorized.

Embedding layer B 31 is a layer that extracts a feature value from the estimation target time and embeds the feature value in a feature space. In the present example, by using the fully connected layer, a convolution layer, and a combination of the fully connected layer and the convolution layer, the feature value of the estimation target time is extracted and vectorized.

In the example in FIG. 4, a vector obtained by adding up the vector expressing the feature value of a piece of data extracted by embedding layer A 30 and the vector expressing the feature value of an estimation target time extracted by embedding layer B 31 is input to the RNN layer 32.

The RNN layer 32 is a layer that further abstracts the feature values embedded in the feature space so as to obtain series data. More specifically, the RNN layer 32 receives the time-series data, circulates abstracted information from the past, and repeatedly performs non-linear conversion. To the RNN layer 32, it is possible to apply a publicly-known structure as long as the network structure is capable of appropriately abstracting the time-series data. For example, it is also possible to use the structure described in Non-Patent Literature 3.

Non-Patent Literature 3: Kyunghyun Cho et al., "Learning phrase representations using RNN encoder-decoder for statistical machine translation". In: arXiv preprint arXiv: 1406.1078 (2014).

The fully connected layer 33 and the output layer 34 compress the abstracted series features into a one-dimensional vector (i.e., a scalar quantity) and further calculates $h_{ij}$ by projecting the compressed result into a value in the range from 0 to 1 by using a sigmoid function or the like.

Alternatively, it is also possible to define $h_{ij}$ as shown below, so as to calculate $h_{10}, \ldots,$ and $h_{iJ}$ in one batch altogether:

$$h_{ij} = f(x_i \mid r_{i-1}; \theta) \quad (2)$$

When using $h_{ij}$ in Expression (1) above, it is possible to explicitly learn the estimation target time. It is therefore possible to perform a learning process while taking into consideration the input feature values and the time difference until an impact is imposed by the input feature values, although a large amount of calculation is required. When using $h_{ij}$ in Expression (2) above, although the amount of calculation is smaller, there is a disadvantage where it is impossible to perform the learning process while the order of estimation target times is taken into consideration.

The parameter estimation unit 22 estimates a parameter of the hazard function so as to optimize a likelihood function expressed by including an event occurrence time given with respect to each of the plurality of pieces of time-series data and a likelihood of the occurrence of an event estimated with respect to each of the plurality of pieces of time-series data.

More specifically, with respect to each of the pieces of time-series data stored in the history time-series database 2, the parameter estimation unit 22 optimizes the model parameter $\theta$ through maximization or the like of the likelihood function, by comparing the hazard function output from the hazard estimation unit 21 with either the event occurrence time or the discontinuation time and the indicator variable and further saves the optimized model parameter $\theta$ into the parameter storage unit 23.

For example, by using the event occurrence time or discontinuation time $e^k$ and the indicator variable $\delta^k$ with the time-series data $X^k$, it is possible to express a likelihood with respect to the time-series data $X^k$ as shown below.

$$L^k(\theta) = \{L^k_b(\theta)\}^{w_b} \times \{L^k_e(\theta)\}^{(w_e \times \delta^k)} \times \{L^k_a(\theta)\}^{(w_a \times \delta^k)} \quad \text{[Math. 3]}$$

$$L^k_b(\theta) = \prod_{i=0}^{|X^k|} \prod_{j=1}^{\min(J,J')} Pr(\Delta t_e > \Delta t_j \mid x^k_0 \ldots, x^k_i; \theta)$$

$$L^k_e(\theta) = \prod_{i=0}^{|X^k|} Pr(\Delta t_{J'-1} < \Delta t_e \le \Delta t_{J'} \mid x^k_0 \ldots, x^k_i; \theta)$$

$$L^k_a(\theta) = \prod_{i=0}^{|X^k|} \prod_{j=J'}^{J} Pr(\Delta t_e \le \Delta t_j \mid x^k_0 \ldots, x^k_i; \theta)$$

In the above equations, the symbol J' denotes a natural number satisfying the expression below:

$$t^k_i + \Delta t_{J'} < e^k \le t^k_i + \Delta t_{J'+1}$$

Further, the partial likelihoods $L^k_b(\theta)$, $L^k_e(\theta)$, and $L^k_a(\theta)$ take into consideration a likelihood in the situation where the estimation target time is earlier than the occurrence of the event, is at the time of the occurrence of the event, and is later than the occurrence of the event, respectively. The symbols $w_b$, $w_e$, and $w_a$ each denote a hyper parameter for adjusting the scale or the degree of importance of the corresponding likelihood.

In this situation, by putting $T_j=(\Delta t_{j-1}, \Delta t_j]$, we have the equations presented below:

$$Pr(\Delta t_e > \Delta t_j) = Pr(\Delta t_e \notin T_1, \ldots, \Delta t_e \notin T_1) \quad \text{[Math. 4]}$$
$$= Pr(\Delta t_e \notin T_1) \times Pr(\Delta t_e \notin T_2 | \Delta t_e \notin T_1) \times$$
$$Pr(\Delta t_e \notin T_j | \Delta t_e > \Delta t_{j-1})$$
$$= \prod_{l=1}^{j} Pr(\Delta t_e > \Delta t_l | \Delta t_e > \Delta t_{l-1})$$
$$= \prod_{l=1}^{j} [1 - Pr(\Delta t_{l-1} < \Delta t_e \le \Delta t_l | \Delta t_e > \Delta t_{l-1})]$$

We therefore have the equations presented below:

$$L_b^k(\theta) = \prod_{i=0}^{|X^k|} \prod_{j=1}^{\min(J,J')} Pr(\Delta t_e > \Delta t_j | x_0^k \ldots, x_i^k; \theta) \quad \text{[Math. 5]}$$
$$= \prod_{i=0}^{|X^k|} \prod_{j=1}^{\min(J,J')} \prod_{l=1}^{j} [1 - Pr(\Delta t_{l-1} < \Delta t_e \le \Delta t_l | \Delta t_e >$$
$$\Delta t_{l-1}, x_0^k \ldots, x_i^k; \theta)]$$
$$= \prod_{i=0}^{|X^k|} \prod_{j=1}^{\min(J,J')} \prod_{l=1}^{j} (1 - h_{il})$$

Further, similarly, we have the equations presented below.

$$L_a^k(\theta) = \prod_{i=0}^{|X^k|} \prod_{j=J'}^{J} Pr(\Delta t_e > \Delta t_j | x_0^k \ldots, x_i^k; \theta) \quad \text{[Math. 6]}$$
$$= \prod_{i=0}^{|X^k|} \prod_{j=J'}^{J} [1 - Pr(\Delta t_e > \Delta t_j | x_0^k \ldots, x_i^k; \theta)]$$
$$= \prod_{i=0}^{|X^k|} \prod_{j=J'}^{J} \left[ 1 - \prod_{l=1}^{j} (1 - h_{il}) \right]$$

$$L_e^k(\theta) = \prod_{i=0}^{|X^k|} Pr(\Delta t_{J'-1} < \Delta t_e \le \Delta t_{J'} | x_0^k \ldots, x_i^k; \theta) \quad \text{[Math. 7]}$$
$$= \prod_{i=1}^{|X^k|} [Pr(\Delta t_e \le \Delta t_{J'} | x_0^k \ldots, x_i^k; \theta) -$$
$$Pr(\Delta t_e \le \Delta t_{J'-1} | x_0^k \ldots, x_i^k; \theta)]$$
$$= \prod_{i=0}^{|X^k|} \left\{ 1 - \prod_{l=1}^{J'} (1 - h_{il}) - \left[ 1 - \prod_{l=1}^{J'-1} (1 - h_{il}) \right] \right\}$$
$$= \prod_{i=0}^{|X^k|} \left\{ (1 - h_{i,J'}) \prod_{l=1}^{J'-1} [(1 - h_{i,J'}) - 1] \right\}$$

$$= \prod_{i=0}^{|X^k|} \left[ h_{i,J'} \prod_{l=1}^{J'-1} (1 - h_{il}) \right]$$

Furthermore, it is possible to obtain a likelihood with respect to the K pieces of time-series data as a product of the likelihoods with respect to the pieces of data as shown in the expression presented below.

$$L(\theta) = \prod_{k=1}^{K} L^k(\theta) \quad \text{[Math. 8]}$$

It is possible to realize a specific method of the optimization, for example, by using a loss function obtained by multiplying logarithms of the likelihood function by $-1$ and implementing minimization while using a publicly-known technique such as backpropagation.

The parameter storage unit 23 stores therein the model parameter $\theta$ estimated by the parameter estimation unit 22.

The event occurrence time estimation unit 24 estimates a time at which an event may occur next, on the basis of the value of the hazard function estimated by the hazard estimation unit 21 and causes the display unit 16 to output the estimated time. For example, the event occurrence time estimation unit 24 estimates the time at which the event may occur next, by performing a simulation based on the hazard function, comparing the value of a survival function (a probability of the event not occurring until $\Delta t$ seconds later) derived from the hazard function with a threshold value, or calculating a probability of the occurrence at each of the estimation target times expressed as below:

$$Pr(\Delta t_j < \Delta t_e \le \Delta t_{j+1} | x_0^k \ldots, x_i^k; \theta)$$

<Effects of the Event Occurrence Time Estimation Device According to the Present Embodiment>

Figure 5:
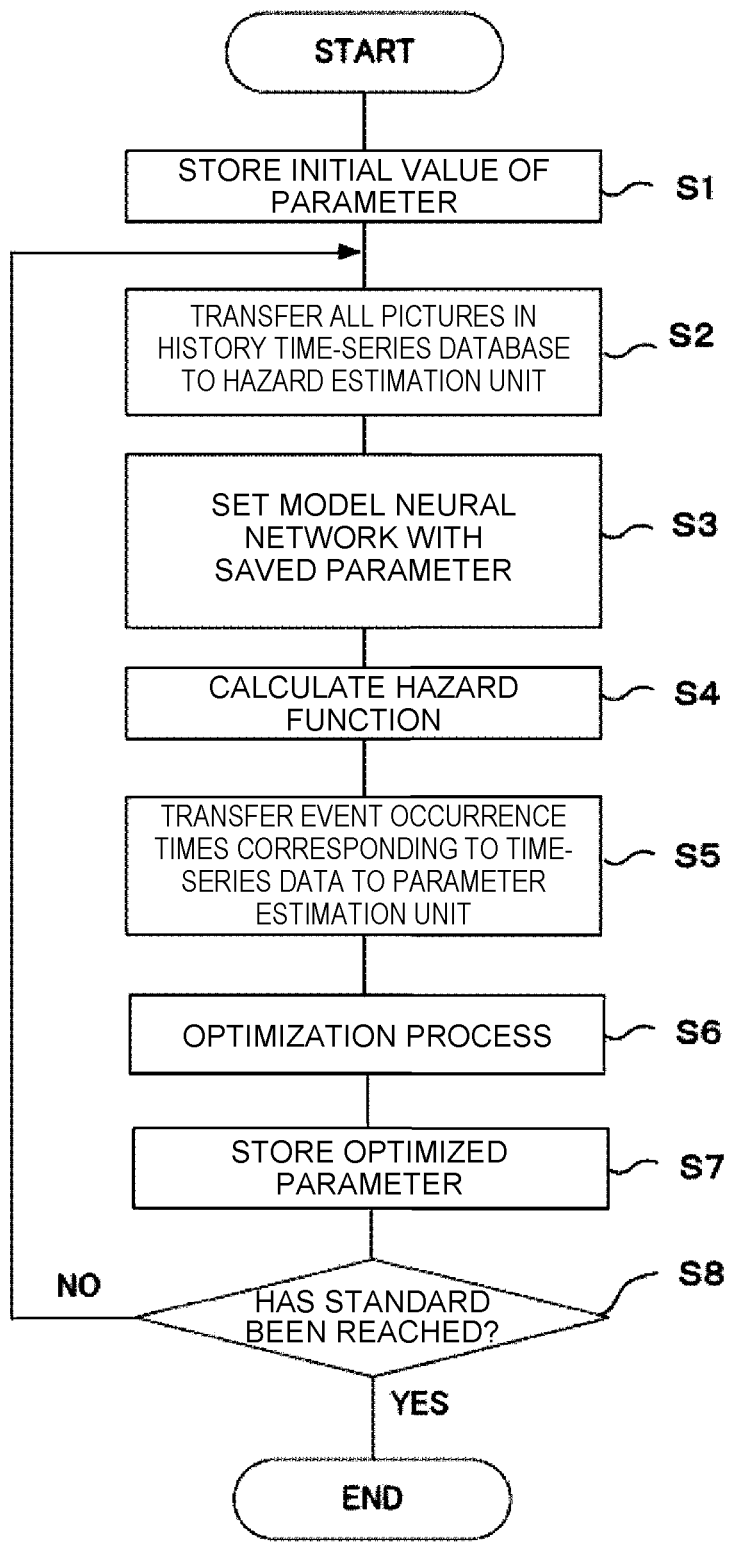
FIG. 5 is a flowchart showing a flow in an event occurrence time learning process according to the present embodiment.

FIG. 5 is a flowchart showing a flow in an event occurrence time learning process performed by the event occurrence time estimation device 10. The event occurrence time learning process is performed as a result of the CPU 11 reading the event occurrence time learning program from either the ROM 12 or the storage 14, loading the read program into the RAM 13, and executing the program.

At step S1, the CPU 11 stores the parameter $\theta$ of the hazard function determined as an initial value with a random number or the like, into the parameter storage unit 23.

Subsequently, at step S2, the CPU 11 transfers the time-series data $X^0, \ldots,$ and $X^K$ included in the history time-series database 2 to the hazard estimation unit 21. The symbol K denotes the number of pieces of time-series data included in the history time-series database 2. In this situation, as for the time-series data $X^k$ transferred to the hazard estimation unit 21, all of the K pieces of time-series data $X^k$ in the history time-series database 2 may be transferred. Alternatively, only a part of the time-series data $X^k$ in the history time-series database 2 may be transferred to the hazard estimation unit 21.

At step S3, while serving as the hazard estimation unit 21, the CPU 11 sets the parameter $\theta$ obtained from the parameter storage unit 23 as a parameter of the neural network in the hazard function.

At step S4, while serving as the hazard estimation unit 21, the CPU 11 repeatedly performs, on the pieces of time-series data $X^k$ (where k is 1 to N), the process (see FIG. 4) of obtaining the hazard function $h_{ij}$ expressing the likelihood of the occurrence of the event at each of the estimation target times $\Delta t_j$ (where j is 0 to J) when a prediction is made at the time $t_1$. The hazard functions $h_{ij}$ obtained with respect to all of the pieces of time-series data $X^k$ are transferred to the parameter estimation unit 22.

At step S5, while serving as the parameter estimation unit 22, the CPU 11 receives the event occurrence times or continuation times and the indicator variables corresponding to the pieces of time-series data $X^k$ and being included in the history time-series database 2.

At step S6, while serving as the parameter estimation unit 22, the CPU 11 optimizes the parameter θ of the hazard function, by maximizing the likelihood function L(θ) expressed by using the transferred hazard functions $h_{ij}$, the event occurrence times or discontinuation times, and the indicator variables.

At step S7, while serving as the parameter estimation unit 22, the CPU 11 stores the optimized parameter θ of the hazard functions into the parameter storage unit 23.

At step S8, the CPU 11 determines whether or not a predetermined standard has been reached (e.g., whether the number of times determined in advance has been reached or whether the change amount in the likelihood function has become equal to or smaller than a reference value). When the determined result at step S8 is in the negative, the CPU 11 returns to step S2.

At step S2, the CPU 11 again transfers the time-series data $\{X^0, \ldots, X^K\}$ included in the history time-series database 2 to the hazard estimation unit 21. The time-series data $X^k$ transferred to the hazard estimation unit 21 may be the same every time. Alternatively, the time-series data $X^k$ transferred to the hazard estimation unit 21 may be different each time. For example, all of the K pieces of time-series data $X^k$ in the history time-series database 2 may be transferred to the hazard estimation unit 21 every time. Alternatively, it is also acceptable to transfer another part of the time-series data $X^k$ in the history time-series database 2 that is different from the part of the time-series data $X^k$ initially transferred to the hazard estimation unit 21, so that parts of the time-series data $X^k$ included in the history time-series database 2 are sequentially transferred. Further, the same times-series data $X^k$ may be transferred multiple times.

Subsequently, the CPU 11 calculates the parameter θ of the new hazard functions $h_{ij}$, by performing the processes at steps S3 through S7. At step S8, the CPU 11 determines whether or not the predetermined standard has been reached and repeatedly performs the processes at steps S2 through S7 until the predetermined standard is reached. When the determined result at step S8 is in the affirmative, the CPU 11 ends the optimization.

Figure 6:
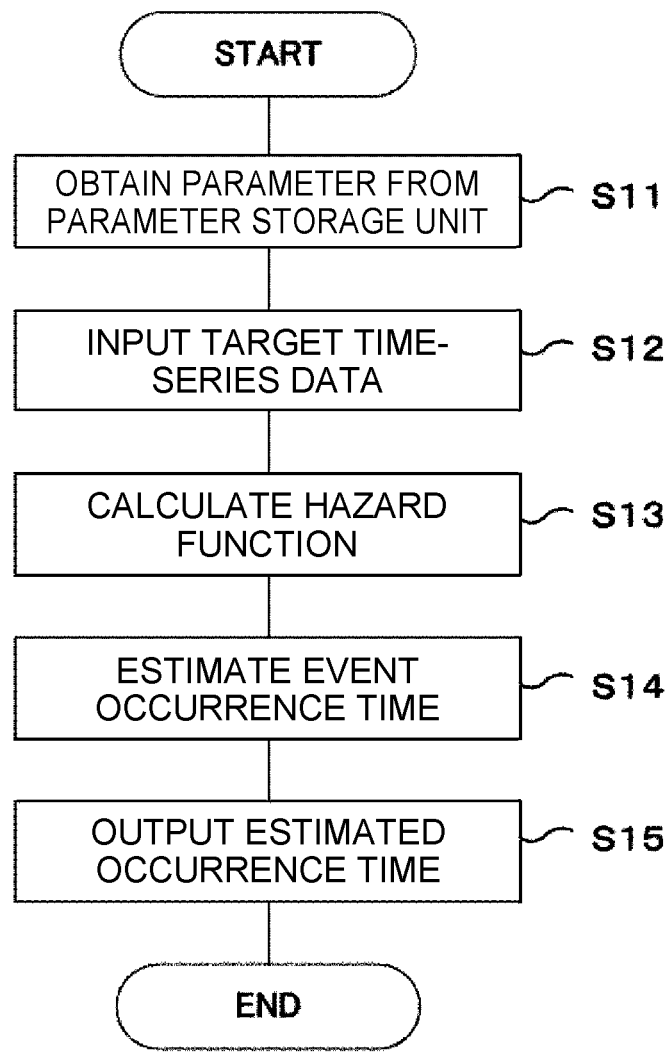
FIG. 6 is a flowchart showing a flow in an event occurrence time estimation process according to the present embodiment.

FIG. 6 is a flowchart showing a flow in an event occurrence time estimation process performed by the event occurrence time estimation device 10. The event occurrence time estimation process is performed as a result of the CPU 11 reading the event occurrence time estimation program from either the ROM 12 or the storage 14, loading the program into the RAM 13, and executing the program.

At step S11, the CPU 11 transfers the optimized parameter θ of the hazard function stored in the parameter storage unit 23 to the hazard estimation unit 21.

At step S12, the CPU 11 receives an input of the target time-series data $X^c$ from the input unit 15 and transfers the input data to the hazard estimation unit 21.

At step S13, while serving as the hazard estimation unit 21, on the basis of the pieces of data $x_{i_c}$ in the target time-series data $X^c$ and the estimation target times $\Delta t_j$, the CPU 11 calculates a hazard function h with respect to each of the estimation target times $\Delta t_j$ indicating an elapsed time period since the end time of the target time-series data $X^c$ and transfers the calculated hazard functions h to the event occurrence time estimation unit 24.

At step S14, while serving as the event occurrence time estimation unit 24, the CPU 11 estimates the next event occurrence time $e_c$, on the basis of the value of the hazard function h with respect to each of the estimation target times $\Delta t_j$. Further, at step S15, the CPU 11 causes the display unit 16 to output the estimated occurrence time $e_c$.

As explained above, with respect to each of the plurality of pieces of time-series data, the event occurrence time estimation device 10 according to the present embodiment estimates the likelihood of the occurrence of the event, according to the hazard function that estimates the likelihood of the occurrence of the event at the estimation target time, on the basis of the feature value of each of the plurality of pieces of data included in the time-series data and the feature value of the estimation target time. The event occurrence time estimation device 10 estimates the parameter of the hazard function so as to optimize the likelihood function expressed by including the event occurrence time given with respect to each of the plurality of pieces of time-series data and the likelihood of the occurrence of the event estimated with respect to each of the plurality of pieces of time-series data. With these arrangements, it is possible to learn the hazard function used for estimating, with an excellent level of precision, the time at which the event may occur, on the basis of the time-series data.

Further, the event occurrence time estimation device 10 according to the present embodiment estimates the likelihood of the occurrence of the event according to the hazard function that estimates the likelihood of the occurrence of the event at the estimation target time, on the basis of the feature value of each of the plurality of pieces of data included in the time-series data and the feature value of the estimation target time. The event occurrence time estimation device 10 estimates the time at which the event may occur next, on the basis of the estimated likelihood of the occurrence of the event. With these arrangements, it is possible to estimate, with an excellent level of precision, the time at which the event may occur, on the basis of the time-series data.

Figure 7:
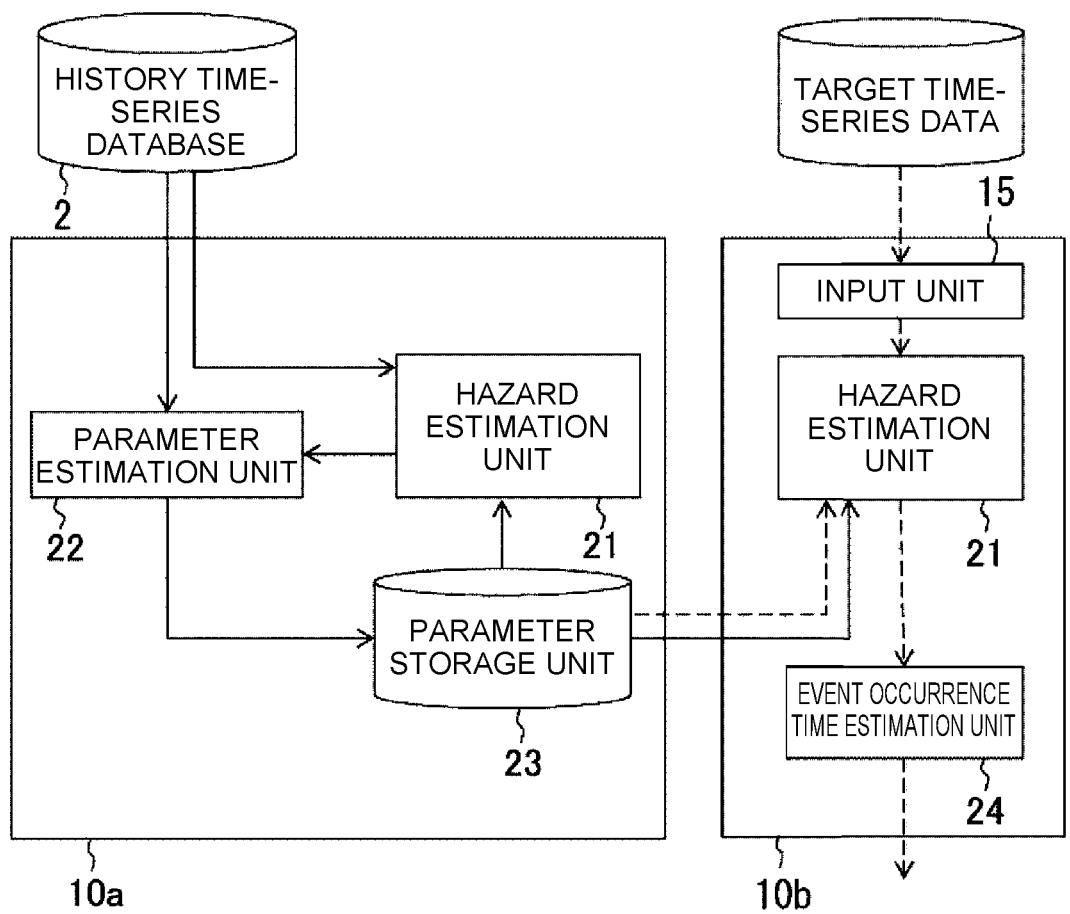
FIG. 7 is a block diagram of an example in which the event occurrence time learning device and the event occurrence time estimation device according to the present embodiment are configured as separate devices.
Figure 8:
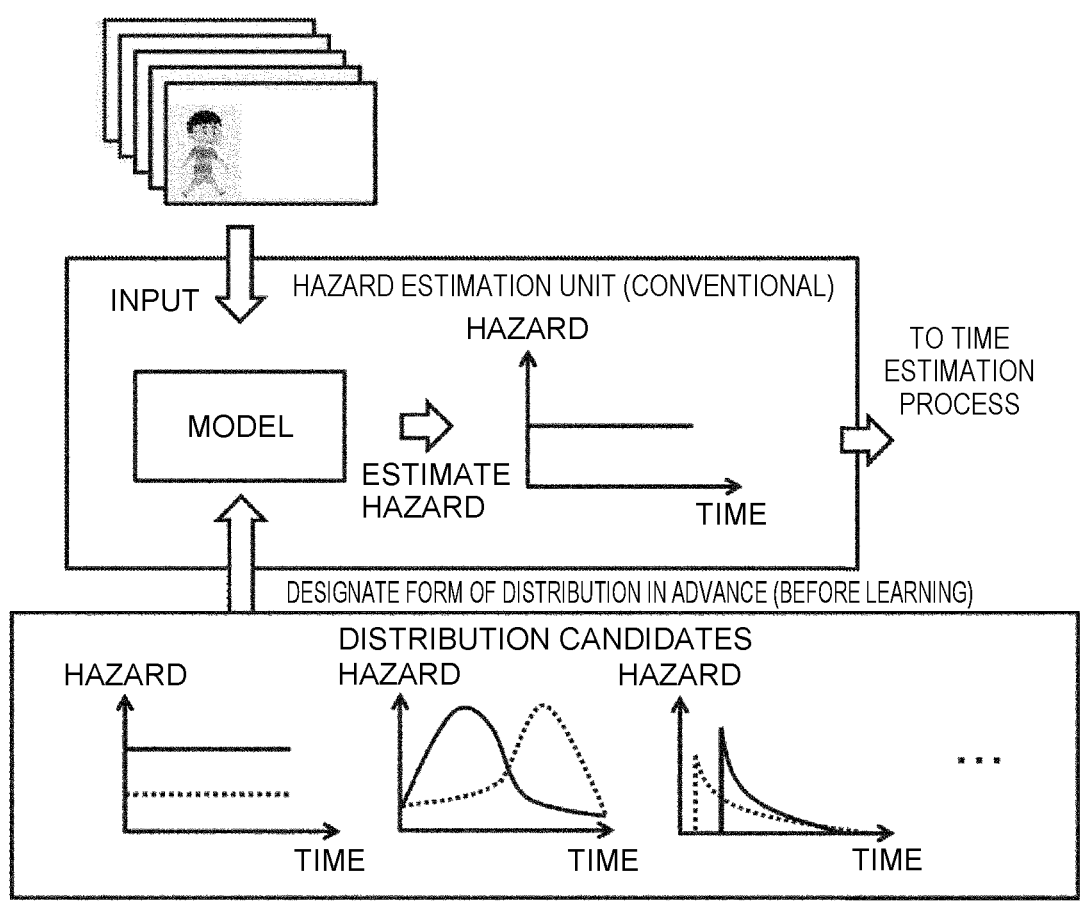
FIG. 8 is a drawing for explaining a method for estimating a hazard according to a conventional technique.

In the present embodiment, the example was explained in which the event occurrence time learning device and the event occurrence time estimation device are configured as the single device. It is, however, also acceptable to configure an event occurrence time learning device 10a and an event occurrence time estimation device 10b as separate devices, as shown in FIG. 7. Because the hardware configuration, the constituent elements, and the flow of the processes are the same as those in the example in which the event occurrence time learning device 10a and the event occurrence time estimation device 10b are configured as the single device, the explanations thereof will be omitted.

Further, the event occurrence time learning process and the event occurrence time estimation process performed by the CPU by reading the software (the programs) in the above embodiments may be performed by any of various types of processors other than the CPU. In that situation, possible examples of the processor include a Graphics Processing Unit (GPU), a Programmable Logic Device (PLD) of which the circuit configuration can be changed after being manufactured (e.g., a Field-Programmable Gate Array [FPGA]), and a dedicated electric circuit realized with a processor having a circuit configuration exclusively designed to perform specific processes (e.g., an Application Specific Integrated Circuit [ASIC]). Further, the event occurrence time learning process and the event occurrence time estimation process may be performed by one of the various types of processors or may be performed by a combination of two or more processors that are of the same type or of mutually-different types (for example, combining a plurality of FPGAs or a CPU with an FPGA). Further, the hardware structure of any of the various types of processors is, more specifically, an electric circuit in which circuit elements such as semiconductor elements are combined together.

Further, in the embodiments described above, the mode was explained in which the event occurrence time learning program and the event occurrence time estimation program are stored (installed) in the storage 14 in advance; however, possible embodiments are not limited to this example. The programs may be provided as being stored in a non-transitory storage medium such as a Compact Disk Read-Only Memory (CD-ROM), a Digital Versatile Disk Read-Only Memory (DVD-ROM), or a Universal Serial Bus (USB) memory. Alternatively, the programs may be downloaded from an external device via a network.

In relation to the embodiments described above, the following supplementary items are further disclosed.

(Supplementary Item 1)

An event occurrence time learning device including:
a memory; and
at least one processor connected to the memory, wherein the processor is configured:
  to estimate a likelihood of an occurrence of an event according to a hazard function, with respect to each of a plurality of pieces of time-series data that are a series of multiple pieces of data to which an event occurrence time relevant to the data is given in advance and that include time-series data in which the event did not occur and time-series data in which the event occurred; and
  to estimate a parameter of the hazard function so as to optimize a likelihood function expressed by including the event occurrence time given with respect to each of the plurality of pieces of time-series data and the likelihood of the occurrence of the event estimated with respect to each of the plurality of pieces of time-series data, and
the hazard function estimates the likelihood of the occurrence of the event at an estimation target time, on a basis of a feature value of each of two or more pieces of data included in the time-series data and a feature value of the estimation target time regarding the likelihood of the occurrence of the event.

(Supplementary Item 2)

An event occurrence time estimation device including:
a memory; and
at least one processor connected to the memory, wherein the processor is configured:
  to receive an input of target time-series data including a series of multiple pieces of data;
  to estimate, with respect to the target time-series data, a likelihood of an occurrence of an event relevant to the data, according to a hazard function using an already-learned parameter; and
  to estimate a time at which the event may occur next, on a basis of the estimated likelihood of the occurrence of the event, and
the hazard function estimates the likelihood of the occurrence of the event at an estimation target time, on a basis of a feature value of each of two or more pieces of data included in the target time-series data and a feature value of the estimation target time regarding the likelihood of the occurrence of the event.

(Supplementary Item 3)

A non-transitory storage medium storing therein a computer-executable program to implement an event occurrence time learning process including:
  estimating a likelihood of an occurrence of an event according to a hazard function, with respect to each of a plurality of pieces of time-series data that are a series of multiple pieces of data to which an event occurrence time relevant to the data is given in advance and that include time-series data in which the event did not occur and time-series data in which the event occurred; and
  estimating a parameter of the hazard function so as to optimize a likelihood function expressed by including the event occurrence time given with respect to each of the plurality of pieces of time-series data and the likelihood of the occurrence of the event estimated with respect to each of the plurality of pieces of time-series data, wherein
the hazard function estimates the likelihood of the occurrence of the event at an estimation target time, on a basis of a feature value of each of two or more pieces of data included in the time-series data and a feature value of the estimation target time regarding the likelihood of the occurrence of the event.

(Supplementary Item 4)

A non-transitory storage medium storing therein a computer-executable program to implement an event occurrence time estimation process including:
  receiving an input of target time-series data including a series of multiple pieces of data;
  estimating, with respect to the target time-series data, a likelihood of an occurrence of an event relevant to the data, according to a hazard function using an already-learned parameter; and
  estimating a time at which the event may occur next, on a basis of the estimated likelihood of the occurrence of the event, wherein
the hazard function estimates the likelihood of the occurrence of the event at an estimation target time, on a basis of a feature value of each of two or more pieces of data included in the target time-series data and a feature value of the estimation target time regarding the likelihood of the occurrence of the event.

REFERENCE SIGNS LIST

2 History Time-series Database
10, 10b Event Occurrence Time Estimation Device
10a Event Occurrence Time Learning Device
15 Input Unit
21 Hazard Estimation Unit
22 Parameter Estimation Unit
23 Parameter Storage Unit
24 Event Occurrence Time Estimation Unit

The invention claimed is:
1. An event occurrence time learning device comprising:
a hazard estimation unit that estimates a likelihood of an occurrence of an event according to a hazard function, with respect to each of a plurality of pieces of time-series data that are a series of multiple pieces of data to which an event occurrence time relevant to the data is given in advance and that include time-series data in which the event did not occur and time-series data in which the event occurred; and a parameter estimation unit that estimates a parameter of the hazard function so as to optimize a likelihood function expressed by including the event occurrence time given with respect to each of the plurality of pieces of time-series data and the likelihood of the occurrence of the event estimated with respect to each of the plurality of pieces of time-series data, wherein the hazard function estimates the likelihood of the occurrence of the event at an estimation target time, on a basis of a feature value of each of two or more pieces of data included in the time-series data and a feature value of the estimation target time regarding the likelihood of the occurrence of the event, wherein according to the hazard function using a neural network, the hazard estimation unit extracts the feature value of each of the two or more pieces of data included in the time-series data and a feature value of an elapsed time period from a time corresponding to a last piece of data in the time-series data to the estimation target time and further estimates the likelihood of the occurrence of the event on a basis of the extracted feature values.

2. The event occurrence time learning device according to claim 1, wherein the time-series data is a group of time-series images formed by a series of multiple images, and the event is an event relevant to one of a person taking the images, an imaged person, and an imaged object.

3. An event occurrence time learning method comprising:

estimating, by a hazard estimation unit, a likelihood of an occurrence of an event according to a hazard function, with respect to each of a plurality of pieces of time-series data that are a series of multiple pieces of data to which an event occurrence time relevant to the data is given in advance and that include time-series data in which the event did not occur and time-series data in which the event occurred; and estimating, by a parameter estimation unit, a parameter of the hazard function so as to optimize a likelihood function expressed by including the event occurrence time given with respect to each of the plurality of pieces of time-series data and the likelihood of the occurrence of the event estimated with respect to each of the plurality of pieces of time-series data, wherein the hazard function estimates the likelihood of the occurrence of the event at an estimation target time, on a basis of a feature value of each of two or more pieces of data included in the time-series data and a feature value of the estimation target time regarding the likelihood of the occurrence of the event, wherein according to the hazard function using a neural network, the hazard estimation unit extracts the feature value of each of the two or more pieces of data included in the time-series data and a feature value of an elapsed time period from a time corresponding to a last piece of data in the time-series data to the estimation target time and further estimates the likelihood of the occurrence of the event on a basis of the extracted feature values.

4. A non-transitory computer-readable storage medium which stores a program for event occurrence time learning that causes a computer to execute:

estimating a likelihood of an occurrence of an event according to a hazard function, with respect to each of a plurality of pieces of time-series data that are a series of multiple pieces of data to which an event occurrence time relevant to the data is given in advance and that include time-series data in which the event did not occur and time-series data in which the event occurred; and estimating a parameter of the hazard function so as to optimize a likelihood function expressed by including the event occurrence time given with respect to each of the plurality of pieces of time-series data and the likelihood of the occurrence of the event estimated with respect to each of the plurality of pieces of time-series data, wherein the hazard function estimates the likelihood of the occurrence of the event at an estimation target time, on a basis of a feature value of each of two or more pieces of data included in the time-series data and a feature value of the estimation target time regarding the likelihood of the occurrence of the event, wherein according to the hazard function using a neural network, the feature value of each of the two or more pieces of data included in the time-series data is extracted and a feature value of an elapsed time period from a time corresponding to a last piece of data in the time-series data to the estimation target time and further estimates the likelihood of the occurrence of the event on a basis of the extracted feature values.

5. The event occurrence time learning device according to claim 1, wherein the time-series data is a group of time-series images formed by a series of multiple images, and the event is an event relevant to one of a person taking the images, an imaged person, and an imaged object.

* * * * *